United States Patent
Hiller

[15] 3,643,853
[45] Feb. 22, 1972

[54] FLUX BACKUP UNIT
[72] Inventor: James J. Hiller, Jennings, Mo.
[73] Assignee: Valley Steel Products Company, St. Louis, Mo.
[22] Filed: Dec. 22, 1969
[21] Appl. No.: 886,857

[52] U.S. Cl..................................228/41, 219/9.5, 228/50
[51] Int. Cl..........................................................B23k 1/00
[58] Field of Search..................228/37, 38, 41, 50; 219/126, 219/9.5

[56] References Cited

UNITED STATES PATENTS

| | | | |
|---|---|---|---|
| 3,548,489 | 12/1970 | Arikawa et al. | 228/50 X |
| 3,227,349 | 1/1966 | Frederick | 228/41 |
| 2,732,470 | 1/1956 | Clotfelter | 219/126 |
| 2,331,937 | 10/1943 | Schreiner | 228/50 X |
| 2,294,439 | 9/1942 | Bagley | 228/50 X |
| 3,196,829 | 7/1965 | Elliott et al. | 228/37 X |

Primary Examiner—John F. Campbell
Assistant Examiner—R. J. Craig
Attorney—Gravely, Lieder & Woodruff

[57] ABSTRACT

A flux backup unit applies a continuous flow of granular flux to the underside of a joint as a weld is made at that joint. The backup unit includes a hopper, an open top container within the hopper, and a feed screw for lifting the flux from the bottom of the hopper to the container. The continuous flow of flux into the container causes the container to remain full as the joint is moved relative to it so that the joint is continuously backed with flux. The excess flux introduced into the container overflows into the hopper and is thereby automatically recirculated through the container by the feed screw.

9 Claims, 3 Drawing Figures

PATENTED FEB 22 1972 3,643,853
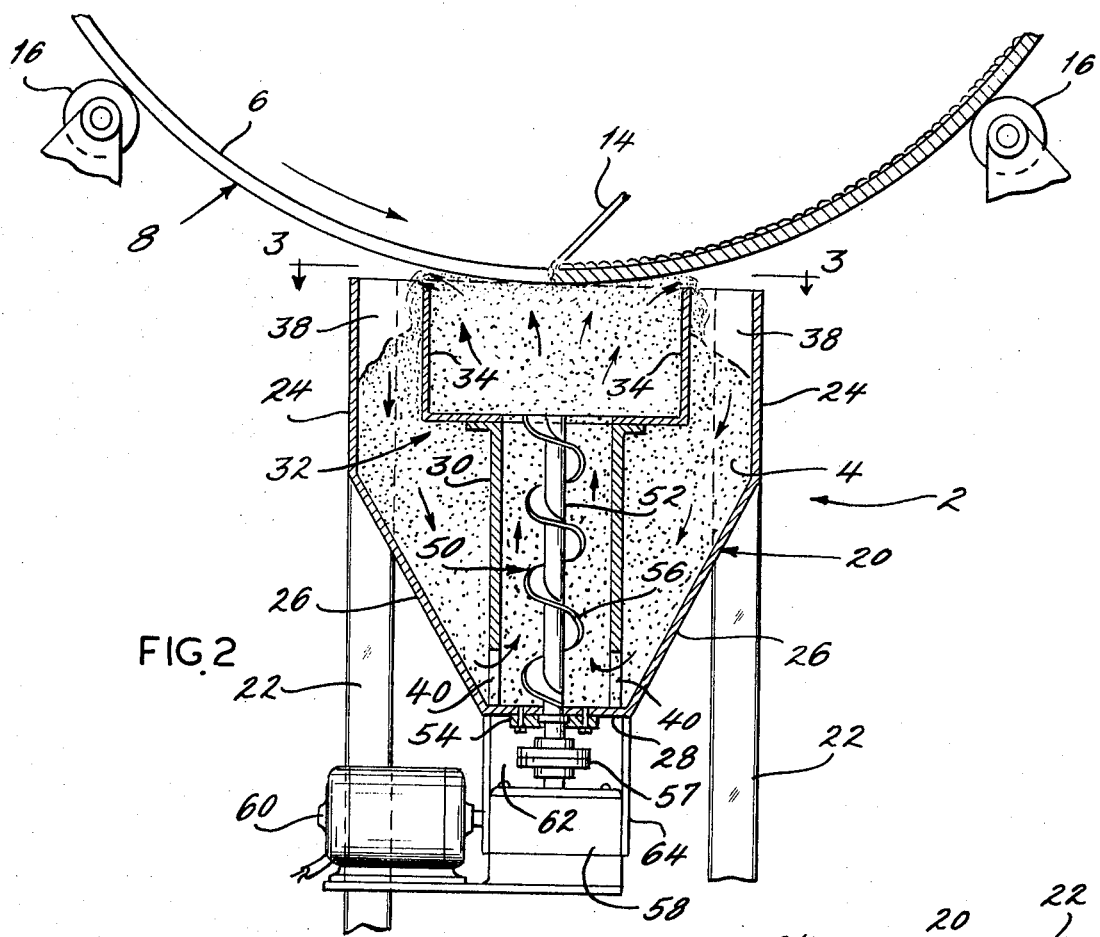
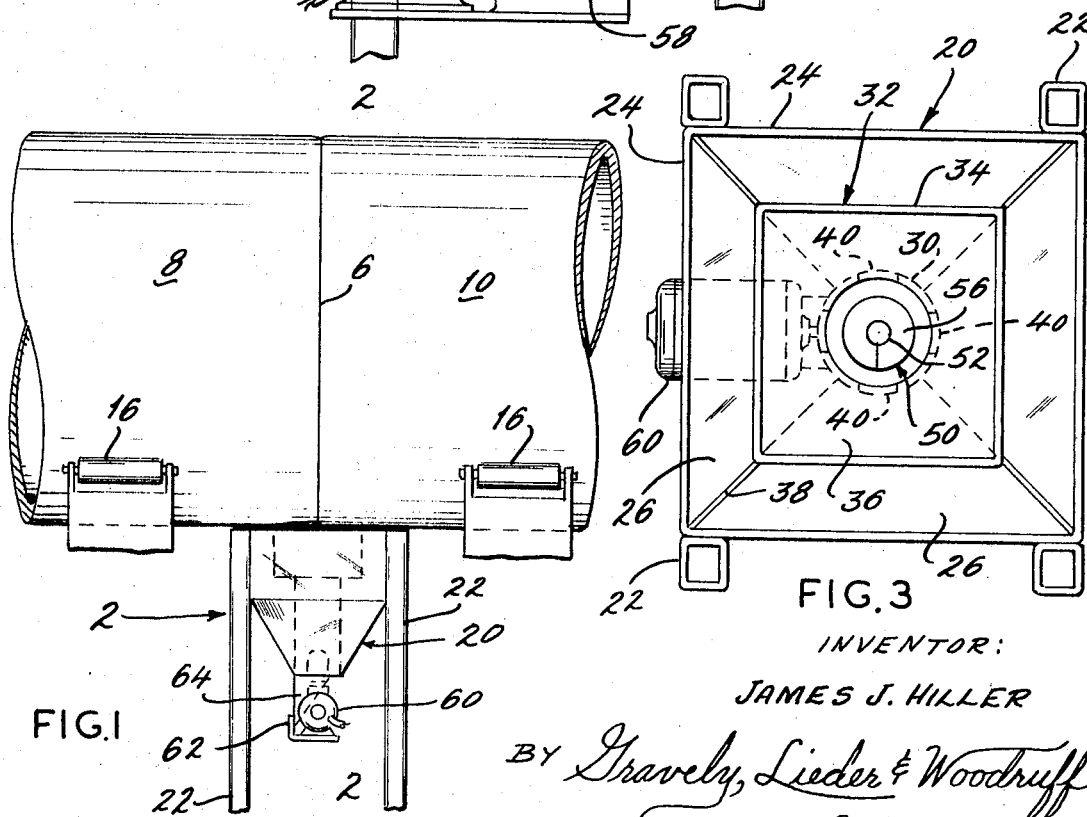
INVENTOR:
JAMES J. HILLER
BY Gravely, Lieder & Woodruff
ATTORNEYS.

3,643,853

FLUX BACKUP UNIT

BACKGROUND OF THE INVENTION

This invention relates in general to arc welding and more particularly to flux backup units for use in arc welding.

Pipes, tank segments, steel plates, and other types of matching members are customarily connected by bringing their ends into abutment and then arc welding them together across their abutting edges. From an economic standpoint, it is desirable to make such welds in a single pass, but when welds of this nature are attempted with full penetration, which is necessary for a satisfactory weld, some sort of backup material must span the joint at the underside of the abutting members to prevent the molten weld metal from falling through the joint.

Heretofore, copper dams and flux laden troughs have been placed along the undersides of such joints to keep the molten weld metal in the joints, but these devices are difficult and time consuming to install, making their value marginal when compared with two welding passes which is an acceptable alternative for achieving full penetration.

Travelling flux backup devices have also been developed, and these devices move relative to the joint and are always positioned opposite the arc. One backup device of current manufacture utilizes a conveyor belt to bring granular flux up to and against the underside of the joint at the point thereon which is opposite to the arc maintained by the welding machine. The belt is normally fed from a hopper and after the flux is conveyed to the joint it falls downwardly into a collecting bin. The flux may be reused, but to do so one must remove it from the bin and pour it back into the hopper. Thus, someone must maintain continuous surveillance over the hopper to insure that it does not run out of flux. Moreover, the conveyor belt approaches the joint of the abutting members at an angle, and by reason of this fact the flux does not initially contact the members at the point where the weld is made. Consequently, the flux is often spread too thinly, resulting in an unsatisfactory weld. Furthermore, these devices on occasion permit gaps to occur in the flow of flux leading to the joint, and this causes the weld crater to fall through the joint and dissipate.

SUMMARY OF THE INVENTION

One of the principal objects of the present invention is to provide a flux backup unit for enabling abutting members to be arc welded to one another in a single pass of an arc welding machine along the top side of the joint between the members. Another object is to provide a backup unit of the type stated which maintains a continuous supply of flux at the joint. A further object of the present invention is to provide a backup unit of the type stated which maintains the flux at a substantial depth beneath the joint. Still another object is to provide a backup unit which recirculates the flux automatically and, therefore, need not be refilled at closely spaced intervals. These and other objects and advantages will become apparent hereinafter.

The present invention is embodied in a flux backup device including a hopper, a flux container for holding granular flux, and means for lifting the flux from the hopper to the container. The container is positioned such that it will overflow into the hopper. The invention also consists in the parts and in the arrangement and combination of parts hereinafter described and claimed.

DESCRIPTION OF THE DRAWINGS

In the accompanying drawings which form part of the specification and wherein like numerals and letters refer to like parts wherever they occur:

FIG. 1 is a side elevational view of a pair of tank sections having a backup unit of the present invention deposed beneath the joint between them;

FIG. 2 is a sectional view taken along line 2—2 of FIG. 1; and

FIG. 3 is a sectional view taken along line 3—3 of FIG. 2.

DETAILED DESCRIPTION

Referring now in detail to the drawings, 2 designates a flux backup unit for furnishing a continuous supply of granular flux 4 against the underside of a joint 6 between two members 8 and 10 (FIG. 1) having matching or complementary ends. The backup unit 2 is, furthermore, always located opposite the point at which a welding machine feeds a welding rod 14 (FIG. 2) toward the joint, and that, of course, is the point at which the electric arc is maintained. The two members 8 and 10 in the particular embodiment illustrated are tank sections which are supported on rollers 16 located on each side of the backup unit 2. Thus, the joint 6 between the members 8 and 10 is advanced past the welding rod 14 and the backup device 2 by rotating the members 8 and 10 on the rollers 16. The members 8 and 10 may also be pipe sections or flat or curved plates. When plates are welded, they may either be advanced so that the joint 6 between them passes between the unit 2 and the welding rod 14; or the unit 2 and the welding rod 14 may be advanced along the plates.

The backup unit 2 includes a hopper 20 which is supported beneath the members 8 and 10 on four uprights 22. The upper end of the hopper 20, that is, the end exposed to the members 8 and 10, is open and is defined by four vertical sideplates 24 which are welded to the upper ends of the uprights 22. The lower end of the hopper 20, on the other hand, tapers inwardly and is defined by four inclined plates 26, each having its upper edge welded to the lower edge of one of the vertical sideplates 24. Each of the plates 26 possesses a trapezoidal shape and the inclined side margins of adjacent plates 24 are welded together. The lower end of the hopper 20 is closed by a horizontal bottom or closure plate 28 which is welded to the lower margins of the inclined plates 26.

The bottom plate 28 supports a vertical feed tube 30 which extends through the lower portion of the hopper 20 and terminates above the lower ends of the vertical sideplates 24 (FIG. 2). The upper end of the feed tube 30, in turn, supports a rectangular feed container or box 32 formed from four sidewalls 34 and a bottom wall 36 connected across the lower margins of those sidewalls 34 so as to close the lower end of the box 32. The feed tube 30 is attached to the bottom wall 36 and opens into the interior of the box 32 through a centrally disposed opening therein. The upper end of the box 32, like the upper end of the hopper 20, is open and is defined by the upper margins of the sidewalls 34. Those margins are, furthermore, coplanar with the upper margins of the sideplates 24. The feed box 32 is stabilized within the interior of the hopper 20 by means of corner braces 38 which connect the corners of the box 32 and the corners at the upper portion of the hopper 20.

Adjacent to the bottom plate 28 of the hopper 20, the feed tube 30 is provided with several elongated cutouts 40 (FIG. 2) which provide communication between the interior of the tube 30 and the lower end of the hopper 20.

Extending completely through the feed tube 30 to the lower end of the feed box 32 is a feed screw 50 (FIGS. 2 and 3) including a shaft 52 which passes through the bottom plate 28 of the hopper 20 and is journaled in a bearing 54 secured to that bottom plate 28. The portion of the shaft 52 disposed within the feed tube 30 has a spiral auger flight 56 wound around it, the flight 56 extending from the vicinity of the cutouts 40 upwardly to the bottom wall 36 of the feed box 32.

At its lower end the shaft 52 is connected through a coupling 57 with a right-angle gear box 58 forming part of a gear motor 60. The gear box 58 of the gear motor 60, moreover, is bolted to a mounting plate 62 which extends downwardly from the lower end of one of the inclined plates 26 on the hopper 20, and the mounting plate 62 is reinforced by a pair of gusset plates 64 which are attached to the lower ends of the adjacent inclined plates 26.

OPERATION

Prior to using, the backup unit 2, the hopper 20 and the feed box 32 are filled substantially to their top margins with the granular flux 4. Thereafter, the unit 2 is positioned beneath the joint 6 between the members 8 and 10 with its feed box 32 located directly beneath and generally centered directly opposite the area of the joint 6 where the welding rod 14 is located. Once the backup unit is correctly positioned, the gear motor 60 is energized and this, of course, rotates the feed screw 50. The spiral auger flight 56 of the screw lifts the granular flux 4 through the feed tube 30 and discharges it into the lower end of the feed box 32 (FIG. 2). If the feed box 32 is not already filled with the flux 4, the feed screw 50 will fill it, and in time the flux 4 will overflow from the feed box 32 across the upper margins of the sidewalls 34. The flux 4 which overflows falls downwardly through the hopper 20 and eventually gravitates to the elongated cutouts 40 where it passes into the interior of the feed tube 30 and is again lifted by the spiral flight 56 on the feed screw 50. Thus, the unit 2 recirculates the flux 4 and a continuous upward flow of granular flux 4 is maintained through the feed box 32. Since the feed box 32 is positioned against the downwardly presented surfaces of the members 8 and 10, the granular flux 4 will be continually forced against the surfaces on each side of the joint 6, so that the flux 4 directly against those surfaces is maintained under a limited amount of pressure.

Once the continuous flow through the feed box 32 is established, an arc is struck between the welding rod 14 and the ends of the members 8 and 10 at the joint 6. That arc creates a molten pool of metal in the joint 6, and its intensity should be such that the pool extends downwardly through the entire depth of the joint 6. In other words, the weld formed by the arc should achieve 100 percent or full penetration. The molten pool of metal is prevented from falling completely through the joint 6 by the granular flux 4 in the underlying feed box 32. Thus, the continuous flow of granular flux 4 through the feed box 32 creates a backing for the molten metal and retains that metal in place until it solidifies.

Once the arc is initiated, the members 8 and 10 are rotated on the supporting rollers 16 so that the joint 6 is advanced at a uniform rate past the welding rod 14 and the open top of the feed box 32. Inasmuch as the feed box 32 is continually supplied with granular flux 4 from beneath, the movement of the members 8 and 10 does not destroy the pressurized backing, notwithstanding the fact that the members 8 and 10 displace some of the granular flux in the direction of movement. The flux 4, furthermore, serves its usual purpose, that is, it keeps the air away from the molten metal. Due to the fact that the feed box 32 has considerable depth, the chances of the molten metal penetrating it are practically nonexistent. Since the backup unit 2 automatically recirculates the flux 4, the unit 2 can be used for extended periods without refilling the hopper 20 with additional flux 4. Moreover, the operator need not maintain continuous surveillance over the hopper 20 to insure that it contains enough flux 4.

When the members 8 and 10 are relatively large cylindrical tank sections, the backup unit 2 may be placed beneath the sections as illustrated or it may be placed within the sections beneath the upwardly presented portion of the joint 6. In the former case, the welding machine would be inside the sections, while in the latter, it would be above the sections.

This invention is intended to cover all changes and modifications of the example of the invention herein chosen for purposes of the disclosure which do not constitute departures from the spirit and scope of the invention.

What is claimed is:

1. A flux backup device for maintaining granular flux beneath a joint between two members to form a dam between those members as they are welded together at the joint; said flux backup device comprising: a flux container for holding the granular flux and having a generally upwardly presented open top over which the portion of the joint being welded is positioned; a collecting hopper disposed at least in part below the open top of the flux container and positioned such that flux overflowing the container from the open top thereof will fall into and be collected in the hopper; and feed means for continuously conveying the granular flux from the hopper to the container, the feed means discharging into the container beneath the upper surface of the flux therein such that the flux supplied thereby rises toward the open top of the container and is forced against the members on each side of the joint, whereby the flux is maintained beneath the joint to form a dam and further overflows from the open top to be collected in the hopper for recycling through the feed means and container.

2. A device according to claim 1 wherein the means introduces the feed flux from the hopper into the bottom of the container so that the flux is forced upwardly through the container.

3. A device according to claim 2 wherein the feed means comprises a tube extending from the bottom of the hopper to the bottom of the container, and a rotatable feed screw positioned within the tube.

4. A device according to claim 3 wherein the feed tube is fastened to the bottom of the hopper and has cutouts for permitting the flux to flow from the hopper into the tube.

5. A device according to claim 2 wherein the container has an upper margin which lies substantially in a horizontal plane and is positioned such that the flux will drop freely into the hopper irrespective of the portion of the upper margin over which the excess flux flows.

6. A device according to claim 5 wherein the container is positioned within and surrounded on all sides by the hopper whereby the flux overflow from the container will fall into the hopper.

7. A device according to claim 3 wherein the lower portion of the hopper tapers inwardly and downwardly terminates at a generally horizontal closure member; wherein the lower end of the feed tube is positioned adjacent the closure member; wherein a portion of the feed screw extends through the closure member; and wherein the feed screw is connected to a power source below the closure member.

8. A device according to claim 7 wherein the container is positioned within and surrounded on all sides by the hopper so that the flux overflow will fall into the hopper; and wherein the feed tube opens into the bottom of the container at substantially the center of the container bottom, whereby the feed tube can be positioned directly beneath the portion of the joint at which the molten weld metal exists.

9. A flux backup device for applying a granular flux to one side of two members along a joint between the members while the members are being welded together at the joint; said device comprising a hopper, a flux container for holding granular flux at the joint to form a dam along the joint and being positioned such that the flux upon leaving the container flows into the hopper, and feed means for moving the granular flux from the hopper to the flux container so that the container is replenished and the flux continuously flows into the hopper, the feed means discharging into the container from behind the surface of the flux which is exposed to the joint so that the flux is forced outwardly through the container and toward that surface.

* * * * *